Dec. 17, 1968  SHOHEI YOSHIMURA  3,416,991
ELONGATE PLASTIC ARTICLES AND METHOD OF MAKING SAME
Filed Sept. 22, 1965  2 Sheets-Sheet 1
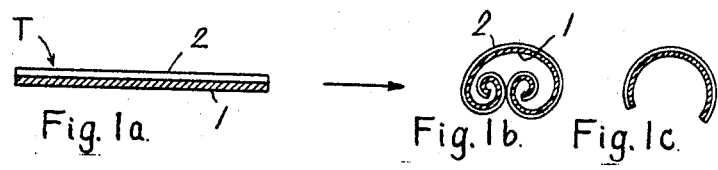
Shohei Yoshimura
Inventor Dec. 17, 1968    SHOHEI YOSHIMURA    3,416,991
ELONGATE PLASTIC ARTICLES AND METHOD OF MAKING SAME
Filed Sept. 22, 1965    2 Sheets-Sheet 2

Shohei Yoshimura
Inventor

By Wenderoth,
Lind and Ponack    Attorneys 3,416,991
ELONGATE PLASTIC ARTICLES AND METHOD OF MAKING SAME
Shohei Yoshimura, Shiga-gun, Shiga-ken, Japan, assignor to Toyobo Co., Ltd., Osaka, Japan
Filed Sept. 22, 1965, Ser. No. 489,153
Claims priority, application Japan, Sept. 22, 1964, 39/54,666
4 Claims. (Cl. 161—101)

ABSTRACT OF THE DISCLOSURE

A structure composed of a tape made up of a laminate of two different polymeric materials, characterized by differential transverse shrinkage following longitudinal stretching, and provided with curled longitudinal edges is obtained by laminating the materials, then cutting the laminate longitudinally to provide elongated tapes, and then stretching the latter. Cores may be inserted into the curled portions. The resultant structures find applications such as wrappers, in handicrafts, as ornaments, and as tire cords.

---

This invention relates to a novel plastic article formed of organic polymer and to a method of producing the same, and particularly it relates to an elongated plastic article such as a cord, coated linear article, ribbon and the like formed of organic polymer and having a curled portion. More particularly it relates to an elongated organic polymer structure formed of a laminate or coated tape having a convolute or curled portion and to a method of producing the same.

Heretofore, there are known various methods of producing cords or the like from organic polymer tapes, including such methods as one which merely applies twists to tapes and another which utilizes thermal shrinkage and applies heat to a multi-layer tape thereby to form a straw yarn. It is also known in producing a coated linear article, that a linear material or core is wrapped with a tape or dipped in a resin solution for coating. Further, there are known various methods for producing a bulky sheet structure, including, for example, such methods as one in which an organic polymer film and a polyurethane foam sheet are bonded together, and another in which a non-embossed organic polymer film is bonded to an embossed organic polymer film.

This invention is based upon an interesting finding that a laminated or coated thin plastic film or tape, when stretched, is caused to be curled or convoluted along each side marginal portion and toward the direction perpendicular to the direction of stretch or to the longitudinal direction of the film or tape, so that an elongated cord like article of plastic material can be obtained therefrom.

I have also found that the coating of a linear article or core such as electric wire can be easily achieved by placing said linear article on such tape and stretching the latter. Further, I have found that an interesting sheet article can be obtained by suitably stacking two or more such tapes or stacking one or more such tapes and an organic polymer film and then stretching the assembly.

It is an object of the invention to provide a novel structure formed of organic polymer, and also a method of producing the same.

Another object of the invention is to provide a novel organic polymer cord-like structure, coated linear article, sheet article composed of an organic polymer sheet, which can be easily produced.

Another object of the invention is to provide a novel cord structure composed of a tape having a convolute or curled portion along each side marginal portion thereof, and a novel article including such tapes.

Still another object of the invention is to provide a method of creating a convolution or a curled portion along each side marginal edge of a tape composed of a base layer and coated layer or lamina layer by stretching said tape.

Other objects and features of the invention will be apparent from the following description and the accompanying drawings wherein:

FIG. 1a is a schematic cross sectional view of a tape, used in this invention but before being stretched;

FIG. 1b is a schematic cross sectional view of an elongated plastic article obtained by stretching the corresponding tape;

FIG. 1c is a cross sectional view of the article obtained by cutting along the longitudinal center line of the article shown in FIG. 1b;

Figure 1D:
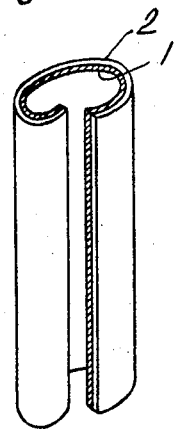
FIGS. 1d and 1e are schematic perspective views respectively of the articles shown in FIGS. 1c and 1b.

Referring to FIG. 1a, a plastic tape T used in this invention is composed of layers or laminae 1 and 2 which become inner and outer layers, respectively, upon stretching the tape.

As organic polymers used as the materials for the tape of the invention there may be exemplified such polyamides as 6 nylon, 6,6 nylon, and 11 nylon; such polyesters as polyethylene terephthalate, and polyethylene tereisophthalate; such polyolefins as polyethylene; polypropylene, poly(ethylenepropylene), and polystyrene; such polyvinyls as polyvinyl chloride, polyvinyl alcohol, and polyacrylonitrile; polyvinylidene chloride; polyethers; polycarbonates; polyurethanes; and polymethacrylates. Copolymers thereof may also be used. Of course, it is to be understood that mixtures of two or more of these organic polymers, and polymer composition added with such modifiers as stabilizer, coloring matter, etc. and those polymers modified as by acetylation and chlorination may also be used in the invention.

Of course the polymers must be those from which stretchable films, sheets, ribbons and other thin articles may be formed. From a melt or solution of the polymer a thin material or film which has been non-oriented or partly oriented is formed by any suitable manner well known in the art. The non-oriented or partially oriented thin films must be those which are capable of being stretched at least in one direction. The films are used as layers or laminae to form the tapes to be used in the invention. Those which are suitable for use as such organic polymers are crystalline polymers, particularly, polyolefins for example, isotactic polypropylene obtained by polymerization using Ziegler-Natta type catalysts.

Such non-oriented or partially oriented thin films are then laminated together in two layers. If necessary, the films are cut into suitable tape widths, prior to the lamination. If desired a film of one polymer may be coated with another film to form a multi-layer composite tape or laminated tape. Such laminating operation may be effected by usual processes. For example, in the lamination process, it is possible to use such means as melt extrusion, heating, adhesives. Further, in the coating process, it is possible to use various coating machines as of the doctor knife type and brush type. In order to develop a satisfactory curl or convolution, the thickness of the lamina or coated layer on a base film should generally be the order of 1–500%, preferably 3–200% based on the base film. The overall thickness of the tape is preferable to be about 0.005–0.5 mm., more preferably about 0.01–0.2 mm.

The polymer material composing the lamina or coating to be applied on the base film should be preferably selected from those having adhesive affinity with the base film for forming a satisfactory composite or laminated tape together, and must be different in chemical and/or physical properties from the base film material. Thus, the base film and lamina (or coating) may be of the same polymers such as polypropylene-polypropylene or similar polymers such as polypropylene-polyethylene or entirely different polymers such as polyester-polypropylene. Where the base film and lamina or coated layer thereon are of the same organic polymers, it is necessary that they have differences in physical and/or chemical properties such as degree of crystallization, orientation and polymerization. Further, it is possible to make them different in nature by effecting or not effecting chemical treatment such as chlorination and adjusting the degree thereof, or by effecting or not effecting copolymerization and adjusting the degree thereof. Particularly preferable is to differentiate the materials by varying the degree of stretching. Thus, for example, a stretched polymer film is used as the base film while non- or less stretched film is used as the lamina or coated layer or vice versa. Generally, as regards the base film polymer and lamina or coated layer, it is preferable that, prior to stretching of the tape according to this invention, the former is 10–99% and the latter is 0–80% in crystallization degree, while in polymerization degree the former is 50–5000 and the latter is 30–5000. A desirable difference in orientation degree between the two is $0.01 \times 10^{-3} – 10 \times 10^{-3}$ in terms of measurement of double refraction index.

In such manner, a tape composed of two layers (the base film or layer and lamina or coated layer) to be used in this invention is obtained. Of course, when it is formed as a broad film or sheet, the latter is cut into tapes by using a suitable cutting machine. In order to develop satisfactory curl or convolution upon stretching, it is preferable that the tape has a width of about 0.05–50 mm., more preferably 0.1–30 mm.

The thus laminated tape T (FIG. 1a) develops a curl or convolution along each side marginal edge portion as shown in FIG. 1b when the tape is stretched longitudinally. The curling occurs to the direction substantially perpendicular to the direction of stretching. The present invention utilizes this novel and surprising phenomenon for obtaining a unique structure from the tape. Although the mechanism of this particular phenomenon has not been completely ascertained, it is believed that upon stretching, the difference in the widthwise shrinkage between the tape-forming layers, i.e. base film and lamina or coated layer contributes to the formation of such curls or convolutions, with the layer of greater degree of shrinkage as the inside thereof. In this connection, it should be pointed out that mere heating of such tape does not always cause the development of curl or convolute.

The stretch ratio may vary over a wide range depending upon the particular polymer(s) used for forming the tape, desired degree of curling or convolution. However, it is generally of the order of 0.2–15, preferably 0.3–12. The temperature at which the longitudinal stretch is conducted is preferable to be about 10–20° C. below the melting point of the organic polymer of the tape. But temperatures above said melting point may also be used in conducting the stretch for developing curls or convolutions. It will be noted that in the stretching operation, periodic changes in stretching ratio or intermittent stretching to provide stretched and non- or less stretched portions along the length of the tape will provide a special structure.

Figure 1E:
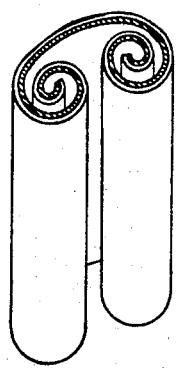

By stretching a tape T such as shown in FIG. 1a there is obtained an elongated plastic article having a curled or convoluted portion along each longitudinal side edge as shown in FIG. 1b and FIG. 1e. Such cord-like structure may find applications such as wrappers, handicrafts, ornaments and tire cords. Further, since such structure has curls or convolutions at both side edges, this may be cut along the longitudinal center line to obtain such an article as shown in FIGS. 1c and 1d. The curled tape may also be twisted. The twisting may be conducted on usual twisting machines such as a ring twister, flyer twister and Italian twister. Further, high speed false twisting machines such as of the disc type and jet type may be used at high temperature. The twists may take the form of slight twists, ordinary twists, intense twists or single or multi twists depending upon the application of the twisted cord.

Figure 2A:
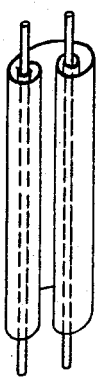
FIG. 2a is a schematic perspective view similar to FIG. 1e but having a linear core within each convolution.
Figure 2B:
FIG. 2b is a schematic perspective view of an article obtained by cutting the article of FIG. 2a along the longitudinal center line.

If a linear or core article is placed along said tape when the latter is stretched to form curls or convolutions, or if such linear or core article is previously contacted with one side of the tape when the latter is stretched, a coated linear article can be obtained as shown in FIG. 2a. Generally, the speed of insertion of linear articles is required to correspond to the stretching speed, though this is not necessarily the case if the linear articles used are capable of being stretched. As such linear articles there may be exemplified natural and/or synthetic articles such as monofilament, multifilament, spun yarn, thread, and cord; and metal lines such as wiring and electric wire. In order to further increase the strength of the bond between linear articles and tapes, adhesive may be applied to the surface of the tape and/or linear article prior to the stretch. It is also possible to increase the strength of bonding by heating the coated articles. The heating temperature may be approximately at the melting point of the organic polymer tape on the linear article. If desired, such coated linear article as shown in FIG. 2a may be cut along the longitudinal center line to separate the two linear elements or articles from each other to provide a structure as shown in FIG. 2b, depending upon particular application. And, it may be twisted.

Each figure numbered and suffixed with "b" schematically shows a structure of an article resulting from the stretch of the assembly shown in the figure correspondingly numbered but suffixed with "a."

The cord like articles of this invention are useful in various applications depending upon the particular structure, such as cords, strings and the like and also as materials for rugs, wall coverings, shock absorbers, clothes, handicraft articles and ornaments. Their utility may further be increased by subjecting them to additional treatment such as printing, coloring, application of adhesive, coating, etc.

EXAMPLE 1

A 40μ thick non-stretched film formed of a polypropylene having an intrinsic viscosity of 0.72 (as measured in tetralin at 135° C., the same being applied equally to the other examples) and a film formed of the same polypropylene but bidirectionally stretched (6 times both in longitudinal and transverse directions) were bonded together by using chlorinated polypropylene (chlorination degree: 30% by weight) and then longitudinally cut to provide 20 mm. wide tapes as shown in FIG. 1a. The tape was stretched at 30° C. with a stretching ratio of 0.7 (this means 70% stretch is applied; such expression is used also in the other examples). Thereupon, there was obtained an elongated cord like plastic article having a curl or convolution along each side edge as shown in FIGS. 1b and 1e, with the bidirectionally stretched film being the inner layer of the curl. The average diameter of the convolute portion was 3.4 mm., and the number of a group of convolutions was about 3.

EXAMPLES 2 TO 10

Two kinds of broad films (designated A and B) were bonded together, cut into narrow tapes and longitudinally stretched, whereupon structures as shown in FIG. 1b were obtained. These results are shown in Table 1. In each example, the film A occupied the inside layer of the curled or convolute portion. The particulars of the films A and B employed are shown in Table 2.

TABLE 1

| Ex. | Film A (thickness) | Film B (thickness) | Bond | Width (mm.) | Stretching Temp. (° C.) | Stretching Ratio | Convolute Aver. dia. (mm.) | Convolute No. of turns |
|---|---|---|---|---|---|---|---|---|
| 2 | PP-I (50μ) | PP-II (50μ) | CP | 10 | 45 | 4.5 | 2.2 | 1.5 |
| 3 | PP-III (30μ) | PE-I (20μ) | CP | 10 | 75 | 3.9 | 2.8 | 1.2 |
| 4 | PET-I (12μ) | PE-II (23μ) | EX | 5 | 35 | 0.7 | 0.8 | 2.1 |
| 5 | PP-IV (30μ) | PE-III (20μ) | EX | 10 | 60 | 5 | 0.8 | 3.7 |
| 6 | PP-V (50μ) | PE-III (25μ) | EX | 15 | ¹15 / 85 | 7.5 | 0.7 | 4.2 |
| 7 | PP-VI (8μ) | PE-IV (15μ) | ST | ²10 | 50 | 0.8 | 0.8 | 4.0 |
| 8 | Cellophane (22μ) | PE-IV (15μ) | CP | 5 | 60 | 0.3 | 1 | 1.8 |
| 9 | PET-I (15μ) | PE-III (10μ) | EX | 10 | 80 | 0.5 | 2.3 | 1.9 |
| 10 | PET-II (40μ) | PETI (30μ) | EX | 20 | 70 | 5.5 | 2.0 | 3.2 |

¹ Stretched between pairs of rollers heated to 15° C. and 85° C., respectively.
² The cutting direction corresponds to the original stretching direction of PP-VI.
Note.—CP=Chlorinated polypropylene (Cl content 35% by weight) adhesive; EX=The film B was extruded on the film A to form a laminate; ST=PP-VI and PE-IV were intimately contacted and stretched together in a direction perpendicular to the stretched direction of PP-VI and thereby bonded together.

TABLE 2

| Film | Particulars |
|---|---|
| PP-I | Non-stretched film obtained from polypropylene having an intrinsic viscosity of 0.53. |
| PP-II | Non-stretched film obtained from polypropylene having an intrinsic viscosity of 1.09. |
| PP-III | Non-stretched film obtained from polypropylene having an intrinsic viscosity of 0.71. |
| PP-IV | Non-stretched film formed of polypropylene having 1.8 dl./g. |
| PP-V | Pearl-lustrous film obtained from non-stretched film formed of polypropylene having an intrinsic viscosity of 1.76 dl./g., by stretching the film between pairs of rollers heated to 15° C. and 85° C., respectively. |
| PP-VI | Non-stretched film obtained from polypropylene having an intrinsic viscosity of 1.76. |
| PE-I | Non-stretched film obtained from low pressure-polymerized polyethylene having a melt index of 10. |
| PE-II | Medium-pressure polymerized polyethylene resin having a melt index of 5.0. |
| PE-III | High-pressure polymerized polyethylene resin having an intrinsic viscosity of 2.7 dl./g. |
| PE-IV | Non-stretched film formed of polyethylene having an intrinsic viscosity of 2.7 dl./g. |
| PET-I | Bidirectionally stretched film formed of polyethylene terephthalate. |
| PET-II | Non-stretched film formed of polyethylene terephthalate. |
| PETI | Polyethylene tereisophthalate resin having an intrinsic viscosity of 0.7 dl./g. (tere/iso ratio: 6/4 by weight). |

What I claim is:

1. An elongated longitudinally stretched tape which consists essentially of a laminate of two laminae of organic polymeric material characterized by differential transverse shrinkage following longitudinal stretching thereof, said tape having a thickness of 0.01 to 0.2 mm. and a width of 0.1 to 50 mm. and having a portion curled upon itself along each longitudinal edge thereof resulting from said differential transverse shrinkage, the lamina of greater shrinkage constituting the inside lamina relative to the curls and being shrunk to a greater degree than the other lamina.

2. An elongated tape according to claim 1, wherein the organic polymeric material is constituted essentially by organic polymers selected from the group consisting of polyamides, polyesters, polyolefins, polyvinyls, polyvinylidene chloride, polyethers, polycarbonates, polyurethanes and polymethacrylates, the individual lamina being characterized by the aforesaid differential transverse shrinkage.

3. An elongated tape according to claim 2, wherein an elongated linear core member is disposed in each said longitudinal curl portion.

4. A method of producing a tape as defined in claim 1, which consists essentially in laminating two layers of organic polymeric material characterized by differential transverse shrinkage following longitudinal stretching, cutting the laminate into narrow tapes, and stretching each tape longitudinally whereby, upon release of the stretching force, a curled portion is formed along each longitudinal edge due to the aforesaid differential transverse shrinkage.

References Cited

UNITED STATES PATENTS

| | | | |
|---|---|---|---|
| 1,905,392 | 4/1933 | Freydberg | 161—104 |
| 2,197,181 | 6/1937 | Katz | 161—104 XR |
| 2,594,229 | 4/1952 | Snyder et al. | 156—229 XR |
| 2,942,300 | 6/1960 | Masters | 264—288 XR |
| 3,194,716 | 7/1965 | Lefevre | 161—104 |
| 3,330,709 | 7/1967 | Zelnick | 156—85 |

M. SUSSMAN, *Primary Examiner.*

ROGER H. CRISS, *Assistant Examiner.*

U.S. Cl. X.R.

161—104, 126, 166; 156—229; 264—288